US006816896B2

(12) United States Patent
Fortin et al.

(10) Patent No.: US 6,816,896 B2
(45) Date of Patent: Nov. 9, 2004

(54) METHOD AND APPARATUS FOR DETECTING CHANGES TO NETWORK ELEMENTS

(75) Inventors: Vincent H. Fortin, Upton, MA (US); Will C. Lauer, Marlborough, MA (US); Lawrence A. Stabile, Cochituate, MA (US); Richard Wallace, Southborough, MA (US)

(73) Assignee: Concord Communications, Inc., Marlboro, MA (US)

( * ) Notice: Subject to any disclaimer, the term of this patent is extended or adjusted under 35 U.S.C. 154(b) by 136 days.

(21) Appl. No.: 10/223,670

(22) Filed: Aug. 19, 2002

(65) Prior Publication Data

US 2003/0120760 A1 Jun. 26, 2003

Related U.S. Application Data

(63) Continuation of application No. 09/286,850, filed on Apr. 6, 1999, now abandoned.
(60) Provisional application No. 60/110,329, filed on Nov. 30, 1998.

(51) Int. Cl.[7] .............................................. G06F 15/177
(52) U.S. Cl. ....................... 709/220; 709/221; 709/222; 709/223; 709/245; 709/250; 709/249
(58) Field of Search ................................. 709/220, 221, 709/222, 223, 245, 249, 250

(56) References Cited

U.S. PATENT DOCUMENTS

| 5,528,759 | A | | 6/1996 | Moore ........................ 709/224 |
|---|---|---|---|---|
| 5,588,119 | A | | 12/1996 | Hare et al. |
| 5,615,323 | A | | 3/1997 | Engel et al. |
| 5,796,951 | A | | 8/1998 | Despain et al. |
| 5,848,243 | A | | 12/1998 | Kulkarni et al. ............. 709/224 |
| 5,848,244 | A | | 12/1998 | Wilson ........................ 709/221 |
| 6,029,196 | A | * | 2/2000 | Lenz ........................... 709/221 |
| 6,098,116 | A | | 8/2000 | Nixon et al. ..................... 710/8 |
| 6,223,218 | B1 | | 4/2001 | Iijima et al. ................. 709/221 |
| 6,237,092 | B1 | * | 5/2001 | Hayes, Jr. ..................... 713/100 |
| 6,295,527 | B1 | | 9/2001 | McCormack et al. .......... 707/3 |
| 6,301,012 | B1 | * | 10/2001 | White et al. ................ 358/1.15 |
| 6,321,258 | B1 | * | 11/2001 | Stollfus et al. .............. 709/220 |
| 6,389,589 | B1 | * | 5/2002 | Mishra et al. ................ 717/170 |
| 6,434,611 | B1 | * | 8/2002 | Wilson et al. ............... 709/221 |
| 6,490,617 | B1 | * | 12/2002 | Hemphill et al. ........... 709/223 |

OTHER PUBLICATIONS

*Network Health User Guide Release 4.0–4.1*, Company User Guide, Concord Communications, Inc., Dec. 1997.
*Network Health Release 4.1 Supplement*, Company User Guide, Concord Communications, Inc., Jul. 1998.

* cited by examiner

*Primary Examiner*—Saleh Najjar
(74) *Attorney, Agent, or Firm*—Wilmer Cutler Pickering Hale and Dorr LLP (57) ABSTRACT

A method provides for merging lists of newly found and old network elements. The method comprises receiving the list of newly found elements and deriving a potential key value for a portion of the newly found elements from configuration data associated therewith and a key format. The method also updates one of the old elements with the configuration data of a newly found keyed element having the same key. The method compares attributes of newly found elements for components to attributes of old network elements for attribute matches and reports matches. The report lists matching old elements and newly found elements as unresolved if either one does not have a unique key.

48 Claims, 9 Drawing Sheets

METHOD AND APPARATUS FOR DETECTING CHANGES TO NETWORK ELEMENTS

CROSS-REFERENCE TO RELATED APPLICATIONS

This application is a continuation of application Ser. No. 09/286,850, filed on Apr. 6, 1999, now abandoned, which is a non-provisional of application Ser. No. 60/110,329, filed on Nov. 30, 1998, the contents of each of which are incorporated herein by reference.

BACKGROUND OF THE INVENTION

This invention relates generally to networks and network management and, more particularly, to detecting configuration changes to network elements.

A network connects together network physical devices, such as routers, bridges, gateways and servers. Each network device may have identifiable physical components, such as central processing units (CPU), disks, partitions of disks, circuits, and interfaces. The network devices can communicate through the network. Through the network devices, the physical components of different network devices can also communicate.

To setup and sustain network communications, it is often useful and necessary to monitor various types of information about the network devices and components. For example, to communicate with a particular network device, one usually needs the destination address of the network device. Similarly, to use all functionalities of a device, one often needs to know the functional type of the network device. Finally, to monitor a network device for operation statistics, one needs the location of those statistics in the device. Useful information on network devices and components include statistical operations data and identification data such as names, network addresses, locations, and functional types.

Henceforth, we will refer to all useful or necessary information for managing or communicating with a network device or component as the associated configuration data.

A variety of physical events can change the configuration data of a network device or component. One such physical event is a reboot of a device. A reboot can change the locations, in a local data base of the device, which store the configuration data for components of the device. Another such event is the removal or addition of an interface card. The removal or addition of an interface card can shift the location, in the local data base of the device, of configuration data for other interface cards. Another such event is the replacement of a device with a new device. The new device will generally have a different hardware identifier, which is a type of configuration data. Finally, a software update may change the configuration data of a device and its included components. Each of the above events change configuration data stored locally in a data base of a network device.

Though not all physical events change configuration data, events causing changes to configuration data may occur on a daily or more frequent basis. A network manager needs up-to-date configuration data from a network device. Using incorrect configuration will cause the manager to retrieve incorrect performance data and statistics on the network.

Henceforth, functional elements, for which a user or network manager desires to know the configuration data, are referred to as network elements. A network element is associated, at any one time, with a particular set of configuration data.

Keeping an up-to-date record of the configuration data of a network element may require correlating data on different network devices and/or components. As an example, consider the effect of replacing a router, which forms a logical link, by a new router. To continue monitoring the logical link, a network manager will need a translation between the record of the configuration data, which he has for the original router, and the configuration data of the new router. Keeping an up-to-date record of the configuration data of network elements becomes difficult as the number of events, which change configuration data, grow.

SUMMARY OF THE INVENTION

In a first aspect, the invention provides a method of merging lists of newly found and old network elements. The method comprises receiving the list of newly found elements and associated configuration data, deriving a potential key value for a portion of the newly found elements from a portion of the configuration data and a key format, and determining whether each newly found element with a potential key value is keyed or unkeyed. A particular newly found element is unkeyed if two of the newly found elements have the same potential key value. One of the old elements is updated with the configuration data of a specific newly found keyed element if the specific newly found and the one of the old elements have the same key.

Some preferred embodiments determine that one of the newly found elements is unkeyed if the potential key value associated therewith is a potential key value of at least two of the old elements.

In a second aspect, the invention provides a method of updating a list of old network elements with newly found network elements. The method includes steps for: receiving a list of newly found elements, and updating one of the old elements with configuration data of one of the newly found elements. The step of updating is performed in response to a proper subset of the attributes of the one of the old elements matching attributes of the one of the newly found elements. The proper subset comprises at least two attributes.

In some preferred embodiments, the attributes of an element are derived from the associated configuration data. In these embodiments, only one of a device's attributes are changed by special events, which change a network device without creating or destroying a network element.

In a third aspect, the invention provides method of reporting updates of old network elements and new network elements. The method comprises receiving a list of newly found elements for components, comparing a plurality of attributes of a portion of the newly found elements with attributes of old network elements for attribute matches. The method includes reporting one of the matches by listing a pair of matching elements as unresolved in response to one element of the pair not having a unique key.

In some preferred embodiments, the method includes steps of reporting a particular newly found element as an unresolved new element if the step of comparing found no attribute matches for the particular newly found element.

In a fourth aspect, the invention provides a program storage device readable by a computer. The program storage device tangibly embodies a program of instructions executable by the computer to perform one or more of above-described methods. In various preferred embodiments, the program storage device is a random access memory, e.g., SDRAM or DRAM memories, a magnetic disk or tape, or an optical disk.

The invention provides a more accurate method for identifying network devices and components with network elements. For example, in response to removing an interface card from a network device, some embodiments recognize that the port assignments of the remaining interfaces change. These embodiments associate the original elements with new configuration data and can help eliminate some incorrect associations with out-of-data configuration data.

The invention provides a method for recognizing some newly found network devices and components as old elements. For example, preferred embodiments identify some new devices as replacements of old devices. In response to identifying a replacement, these embodiments stop sending transmissions to the old device thereby eliminating useless transmissions to the non-existent old devices.

BRIEF DESCRIPTION OF THE DRAWINGS

Other objects, features, and advantages of the invention will be apparent from the following description taken together with the drawings in which.

DESCRIPTION OF THE PREFERRED EMBODIMENTS

The Network

Figure 1:
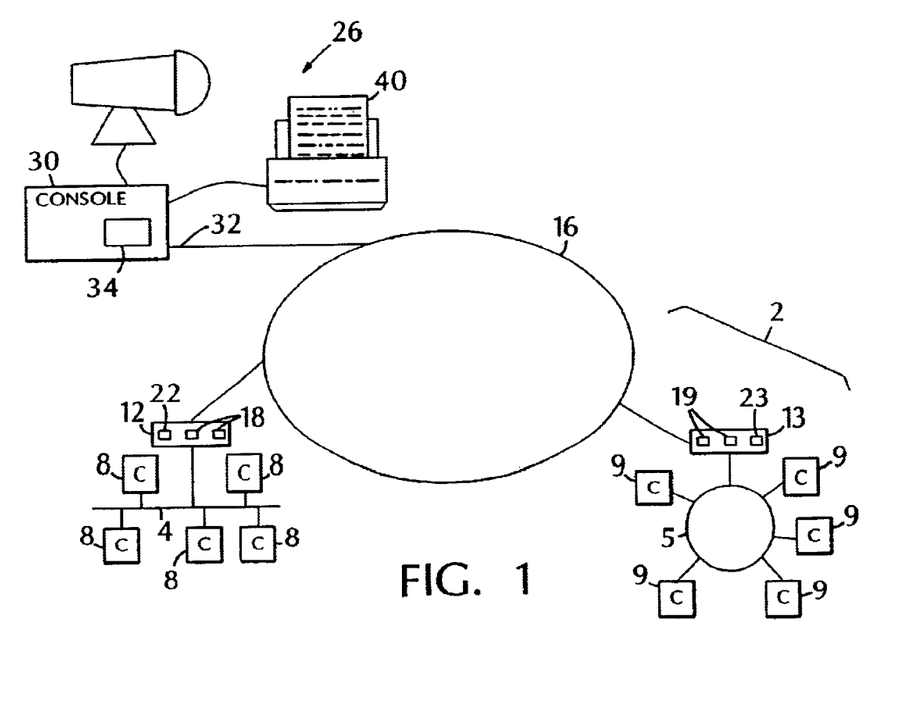
FIG. 1 shows an exemplary network having a plurality of network devices and components.

FIG. 1 shows an exemplary wide area network (WAN) 2, connecting a variety of separate segments 4, 5. Each segment 4, 5 supports local communications between components 8, 9 of the segment 4, 5. The components 8, 9 may include work stations, interface cards, central processing units (CPU), drives, partitions of drives, or other identifiable parts of network devices. A WAN, a local area network (LAN), an asynchronous transmission mode (ATM) line, a fiber distributed data interface (FDDI), a bus, or/and wire connects the components 8, 9 of the same segment 4, 5. A segment's network physical device 12, 13 connects the segment 4, 5 to a larger network 16. The network device may be a router, bridge, gateway, server, or other network device. The network devices 12, 13 support at least one network protocol, which enables communications between the network devices 12, 13, of the larger network 16. The network devices 12, 13 enable transmissions between the components 8, 9 of the different segments 4, 5 via the network 16.

Typically, the network devices 12, 13 have components 18, 19 and a local data base 22, 23 for collecting and storing data about the device 12, 13 and the components 18, 19 thereof. The components 18, 19 of the network devices 12, 13 may be interface cards, central processing units (CPU), drives, partitions of drives, or other identifiable parts of the devices 12, 13. The local data base 22, 23 is located in the device 12, 13. Each local data base 22, 23 has a set of counters, which are identified by object identifiers (OIDs). The OIDs are stored in a portion of the local data base referred to as the management information base (MIB). The object identifiers (OIDs) identify locations storing data on the device 12, 13 and the components 18, 19 of the device 12, 13. The local data base 22, 23 may also store data on the operation of the associated segment 4, 5. The local data bases 22, 23 communicate with other devices, e.g., a network management system 26, through simple network management protocol (SNMP).

The management system 26 keeps a record of the network elements and of the configuration data associated with each network element. The management system 26 includes a management computer 30, which has an interface 32 connecting it to the large network 16. The management computer 30 has an internal memory 34 for storing a program to track the configuration data of the network elements for the network devices 12, 13 and the components 18, 19 of the network devices 12, 13. The network devices 12, 13, transmit configuration data from their local data bases 22, 23 to the management computer 30. These transmissions of configuration data are either responses to SNMP requests from the management computer 30 or regular transmissions not stimulated by SNMP requests.

Figure 2:
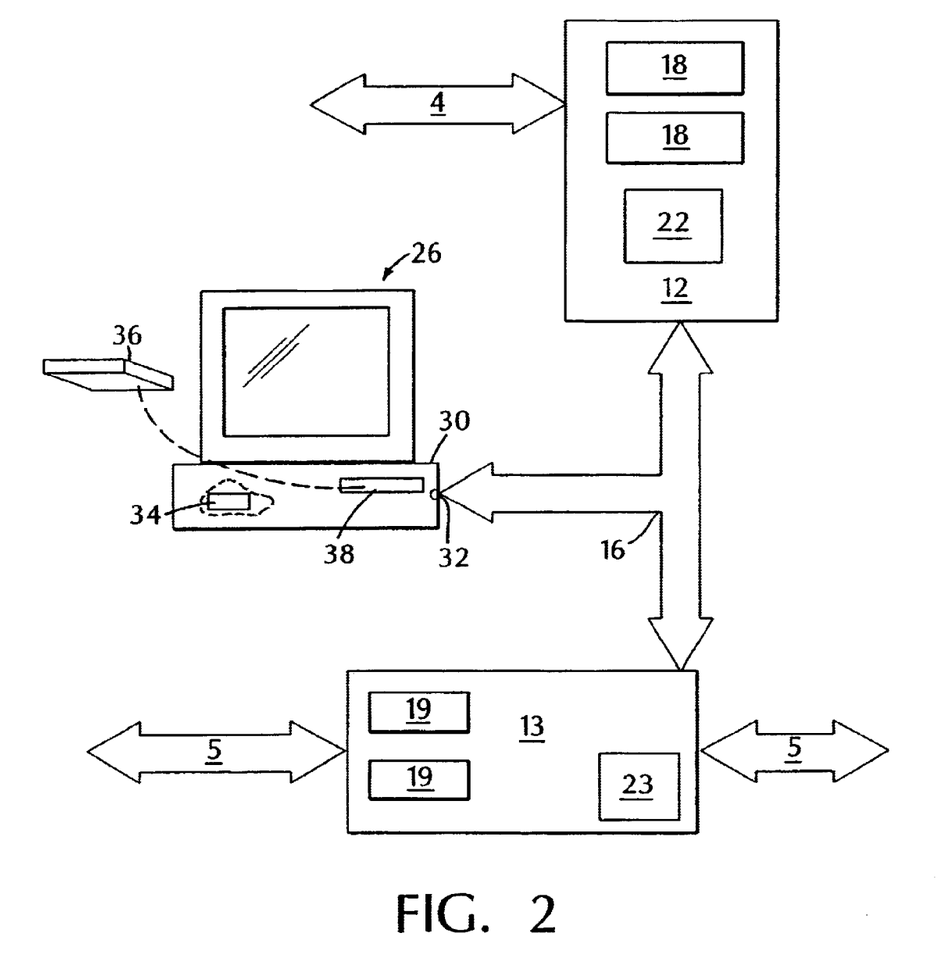
FIG. 2 shows one embodiment of the network management system of FIG. 1.

FIG. 2 shows a program storage device 36 readable by a drive 38 of the management computer 30 of FIG. 1. The program storage device 36 may be a magnetic disk, a magnetic tape, an optical disk or another data storage device. The program storage device 36 stores a program for recording and reporting the configuration data associated with the elements of the large network 16. The program is in a form readable by the drive 38 and executable by the computer 30 and encodes instructions for embodiments of methods to be described below. An internal main memory 34, i.e a dynamic random access memory, of the computer 30 may also store the program in executable form. The programs generate a graphical user interface for automatic and/or interactive recording and reporting of the configuration data for the network logical elements associated with the devices 12, 13 and components 18, 19.

Reports

The management computer 30 of FIGS. 1 and 2 stores a record of the known network elements and the configuration data associated with each of the known network elements.

The management computer 30 periodically generates reports 40 of changes to the network 16. Running a new report 40 updates the configuration data of the previously known elements from a list of newly found elements and associated configuration data. Henceforth, the previously known elements are referred to as old elements. Each newly found network element of the list is either an old network element for which the configuration data has changed or a new network element. The reports 40 indicate a new element, if the computer 30 can resolve that one of the newly found elements is really a new element. The reports 40 indicate an updated old element if the computer 30 can resolve that a newly found element is really an old element with modified configuration data. The reports 40 give the configuration data of new and updated elements. The reports 40 also indicate a newly found element as unresolved if the management computer 30 is unable to resolve whether the newly found element is a new element or an old element for which the configuration data has changed. The reports 40 may give a portion of the configuration data of unresolved elements. The programmed computer 30 generates the reports 40 either automatically, at regular intervals, or interactively in response to a request by a network manager.

Figure 3:
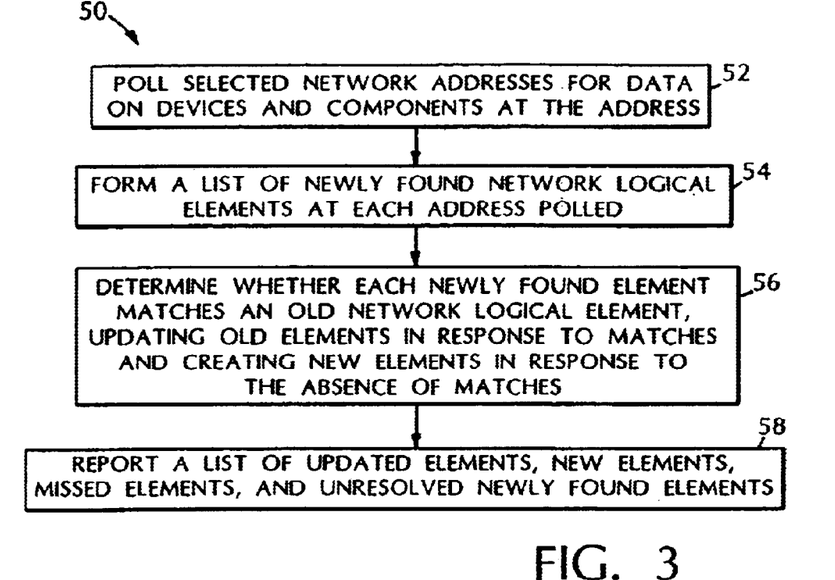
FIG. 3 is a flow chart illustrating one method of reporting the elements of the network of FIG. 1.

FIG. 3 is a flow chart illustrating a method 50 of recording and reporting the elements of the network 16 of FIG. 1. Initially, the management computer 30 polls selected network addresses for configuration data on network devices and components at the polled addresses (block 52). The computer 30 polls an address by transmitting an SNMP request the address. The SNMP request is for configuration data stored in a local database 22, 23, i.e. MIB data. If the selected address has a network device 12, 13, the device 12, 13 transmits the requested configuration data from the local data base 22, 23 therein to the computer 30.

From the results of polling, the management computer 30 makes a list of newly found network elements and associated configuration data (block 54). The list contains one newly found network element for each device and component found at one of the polled addresses. Next, the computer 30 checks for various types of matches between portions of the configuration data of the newly found and old network elements (block 56). Some matches identify newly found elements as old elements for which the configuration data has changed. In response to finding such matches, the computer 30 updates the configuration data of the old elements having matches (block 56). An update of an old element replaces portions of the associated configuration data, which differ from the configuration data of a matching newly found element, with the configuration data of the newly found element. The computer 30 also creates new elements for newly found elements for which matches with old elements do not exist. The computer 30 reports an updated list of network elements and a separate list of newly found elements, which could not be resolved as new or updates of old elements (block 58). The updated list includes updated old elements, new elements, and missed old elements, i.e. old elements not matching any newly found elements. The computer 30 also reports a list of newly found elements, which the computer 30 could not resolve as being either new elements or updates of old elements. From this list of unresolved elements, the network manager can decide which elements correspond to updates of old elements and which elements correspond real new elements, e.g., by using supplementary data.

Configuration Data, Attributes, and Keys

The specific embodiments record and report particular types of configuration data. For clarity, it is helpful to define these types of configuration data before disclosing the embodiments themselves.

The specific embodiments record and report several types of configuration data for the network devices 12, 13 and the components 18, 19 of the network devices 12, 13 of the segments 4, 5. One such type of data, is an address on the larger network 16, which serves to locate the network device 12, 13. Another such type of data is a community string, which serves as a password for accessing the particular devices 12, 13. Another such type of data is descriptive data from the network device 12, 13, which is accessed by SNMP and stored in the MIB portion of the local data base 22, 23. This data includes variables such as sysName, ifDesc, etc., which are stored in the local data base 22, 23. A further such type of data is a list of object identifiers (OID). OIDs identify the network device 22, 23 and the components 18, 19 of the device 12, 13. The OID's are identified by MIB translation file (MTF) values and indexes. This data is collected when collecting statistics from one of the network devices 12, 13. In the specific embodiments, configuration data consists of network addresses, community strings, indexes, MTF (MIB translation file) values and data from the MIB portion of the local data base 22, 23, e.g. sysName, ifDesc, etc.

In the appendix, Table 1 shows the types of configuration data recorded and reported by the monitoring computer 30. Network elements associated with some types of network devices and components of network devices may not have associated configuration data of each type.

A variety of physical events can change some of the configuration data recorded and reported by the specific embodiments. For example, consider indexes for OID's. Upgrading or rebooting one of the network devices 12, 13 may change a portion of the indexes for OID's of the components 18, 19 of the network device. Similarly, removing or adding an interface card from one of the network devices 12, 13 can also shift the indexes of the remaining interface cards. Thus, the OID's and indexes do not provide a generally stable set of identifiers for the network elements.

Some physical events either create new network elements or destroy old network elements. Other events do not create or destroy elements. Rather, they change some of the configuration data of existing network elements, e.g., many software upgrades. The embodiments give methods for tracking the identification of network elements with network devices and components of network device before and after events, which do not actually create or destroy network elements.

To perform these identifications, special types of configuration data are useful. The special types include "keys" and "attributes". Keys do not change after events, which do not create or destroy network elements. Similarly, attributes change in simple ways after events, which do not create or destroy network elements. Keys and attributes can identify newly found network elements with network elements known before such types of events.

In the appendix, Table 2 shows some types of configuration data, which do not change as long as events do not create new network elements or destroy existing network elements. Combinations of the configuration data of Table 2 will define keys, which uniquely identify network elements.

Each device and component has several special types of configuration data referred to as "attributes".

In the appendix, Table 3 lists the types of attributes for network devices 12, 13. They include network address, hardware identifier (ID), and system name. The network address is the network location identifier of the device 12, 13. The hardware ID identifies the particular network device 12, 13, e.g., by a chassis serial number. The system name is a name for the device 12, 13, which is stored in the associated local data base 22, 23 by a user or the management system.

In the appendix, Table 4 shows the types of attributes of components. They include the identity of associated network device as defined by the device attributes of Table 3, the set of MTF values of the component, and the set of indexes of the component. The attributes of the associated device define the identity of a device. The other component attributes have already been described.

Many complex events, which do not create or destroy network elements, can be decomposed into a sequence of simple events. Simple events are events, which do not change more than one type of attribute of a network device or of a component of a network device. Attributes can identify devices and components associated with elements as long as not too many simple events have occurred since the last update of the attributes associated with the element.

There are many types of simple events. For example, simple events include rebooting a device, replacing a device by a new device of the same type, and changing a network address of a device. These events do not change more than one attribute of the device or of its components. Similarly, simple events include removing an interface card, replacing a CPU, and redefining a MIB value, e.g., the value of the ifDescr variable. These events do not change more than one type of attribute for a component of a device.

Simple events change, at most, one of the three attributes of a device. For example, moving a device to a new network address does not change either the hardware ID and system name. Similarly, replacing a network device at a fixed network address with a replacement device will generally not change the system name of the device. The person replacing the device also normally transfers data from the local data base of the old network device to the replacement device thereby giving the same system name to the replacement device. For these examples, only one attribute of a network element for a device changes. For general simple events, a match of two out of three attributes identifies an element to the network devices before and after the simple event.

The embodiments also employ attribute matching to determine whether a newly found element is actually a new element. For example, reusing a device 12, 13 for a different purpose creates a new network element. The reused device 12, 13 is ordinarily at a different network address and has a new system name in the local data base 22, 23 thereof. A comparison of the attributes of the reused device 12, 13 to those of the original elements produces one match, i.e. the hardware ID. The reused device can be seen to be new by a comparison of its attributes with the attributes of elements existing before doing the replacement. If no more than one of the attributes matches those of old elements, the device 12, 13 is really a new element. The specific embodiments define a match of one or no attributes between two elements for devices to mean that the elements are different.

Identifications of components of devices based on attribute matches are non-unique, and the specific embodiments treat such matches as unresolved situations. A network device with adjacent and identical interface cards offers an example of the non-uniqueness. Removing one card can shift the indexes for the remaining card so that the remaining card has the same address, indexes, and MTF's as the removed card had. Thus, after a removal, an attribute match would indicate that the remaining card is associated with the old element for the removed card, i.e. prior to removal. Nevertheless, the remaining card and the element for the removed card are different network elements. Since different elements for components can have matching attributes, the report labels attribute matches for components as unresolved matches. Using the report 40 and supplementary information, a network manager can determine, by inspection, whether such matches indicate new elements or updates of old elements.

The portions of the configuration data listed in Table 2 of the appendix are insensitive to events, which do not create or destroy network elements. For some elements, special combinations of the configuration data from Table 2 produce formats for substantially unique identifiers referred to as a keys. The special combinations are referred to as key formats.

Not only do events not creating or destroying elements not change the values of keys, each value for a key format occurs for a unique network element. The uniqueness of the values of a key format must be confirmed empirically as described below. The existence of a key format for a component does not guarantee that an element for the component has a key. If an element has a key, the key provides a unique identifier for the element.

In the appendix, Table 5 shows the key formats used by the specific embodiments. Key formats are not available for every network device and component. Similarly, the existence of a key format for a component or device is strong, but not an absolute sure indication that the element associated with the component or device has a key. The uniqueness of the key must be empirically checked for the elements. The specific embodiments use keys only to identify elements associated with components.

Recording and Reporting Network Elements

Henceforth in this application, components will refer to components of network devices.

Figure 4A:
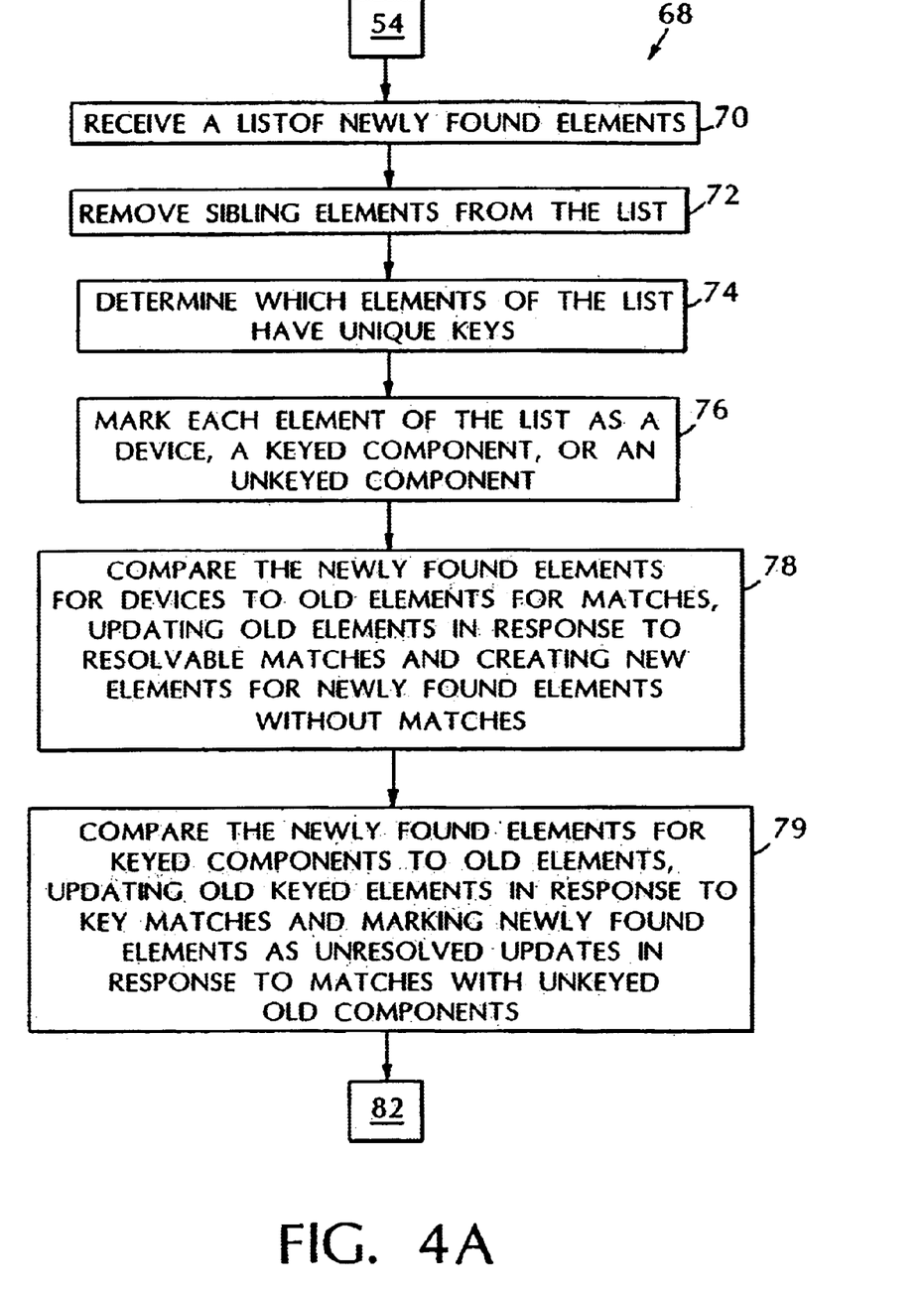
FIGS. 4A–4B is a flow chart illustrating one method of merging lists of newly found and old elements in the method of FIG. 3.
Figure 4B:
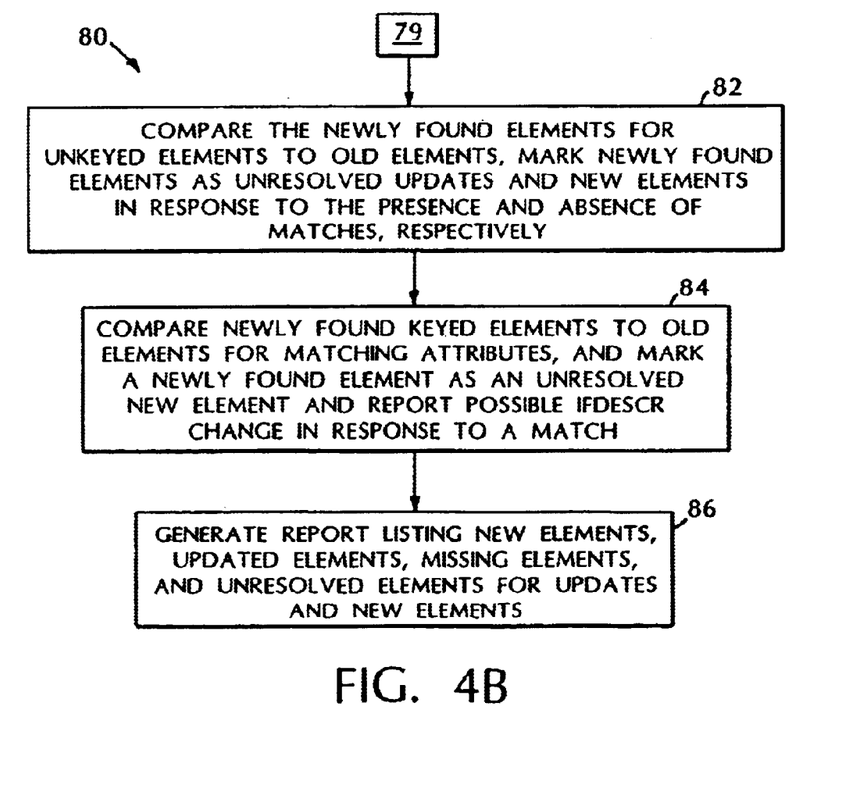

FIGS. 4A–4B illustrate a method 68, 80 according to which the computer 30 of FIG. 1 merges the configuration data of a list of the newly found elements with that of old or previously-known elements. The method 68, 80 updates the list of old elements using the newly found elements and the associated configuration data from block 54 of FIG. 3.

Generally, the merging starts with the computer 30 receiving a list of newly found network elements and associated configuration data (block 70). The computer 30 removes sibling elements from the list (block 72). Sibling elements are pairs of elements, which have identical configuration data except for the network addresses. Sibling elements occur when one of the network devices 12, 13 has more than one network address and thus, was found more than once during polling at blocks 52–54 of FIG. 3. Leaving siblings in the list would result in duplicate elements for the same network devices and components.

After removing sibling elements, the computer 30 determines which of the newly found elements are associated with a component having a key format. The computer 30 determines which of these elements have "unique" key values (block 74). The subset of the elements for components for which the value of the key is unique are referred to as elements for keyed components. In response to determining which elements have unique keys, the management computer 30 marks each newly found element as an element for either a device, a keyed component, or an unkeyed component (block 76).

To perform the steps of reporting updated old, new and unresolved elements, the computer 30 first deals with newly found elements for devices 12, 13 and then, with newly found elements for components 18, 19.

For newly found elements for the devices 12, 13, the computer 30 determines whether each such element matches an old element (block 78). The computer 30 updates a matching old element by replacing any changed configuration data of the old element with configuration data of the newly found element matching the old element. The computer 30 creates new elements for any newly found elements without matches among the old elements.

For newly found elements for components, the computer 30 considers keyed and unkeyed newly found elements separately. First, the computer 30 determines whether each newly found element for a keyed component "key" matches an old element (block 79). The computer 30 updates any old element for a component 18, 19 if the old element has a key match. To perform the update, the computer 30 replaces any changed configuration data of the old element with the configuration data of the matching newly found element. Then, the computer 30 determines whether each newly found element for an unkeyed component matches an old element (block 80). The computer 30 marks newly found elements with and without matches as unresolved updates and new elements, respectively (block 82). Finally, the computer 30 compares the attributes of the newly found and old keyed elements for matches (block 84) and reports any matches unresolved new elements with possible ifDescr changes. The computer 30 marks any newly found keyed elements without matches as an unresolved new elements.

Next, the computer 30 generates a report, i.e. the report 40 of FIG. 1, listing new elements, updated elements, and missing elements and separately listing unresolved updates and new elements (block 86). For each element listed in the report, the computer 30 also lists a subset of the associated configuration data. For example, the subset includes changed configuration data of an old element being updated and all configuration data of a new element. The computer 30 also reports elements with different keys, but having the same attributes, as having possible ifDescr changes. IfDescr changes may or may not be associated with new elements even though a key changes, because ifDescr changes can be caused both by events that create new elements and by events that do not create new elements. A network manager may be able to resolve ifDescr changes automatically with supplementary information on the particular network 16.

In FIGS. 4A and 4B, the method 68, 80 uses criteria for probable matches to identify newly found elements, which are updates or new elements, and criteria for potential matches to identify newly found elements, which cannot be resolved. Potential matches and probable matches exist when only selected portions of the configuration data, which is used for finding matches, actually matches. In a probable match, the computer 30 can determine from the match of the selected portion that two elements are identical. Independent verification of the match, by a system manager, is deemed unnecessary. The unselected portion of the configuration may differ between the matching elements due to an event, which does not create or destroy network elements. A two out of three match for the device attributes of Table 3 is a probable match. The computer 30 updates the configuration data of elements in response to probable matches, i.e. these are resolvable situations.

In a potential match, the computer 30 cannot determine whether a match occurred or not, but a match is sufficiently possible to warrant reporting the situation to a system manager at block 86 of FIG. 4B. The computer 30 is also not sure enough of a match to perform an update of a potentially matching old element unless the update is reviewed by the system manager. Nevertheless, a potential match is sufficiently possible to warrant reporting the situation to a system manager at block 86 of FIG. 4B. In a potential no-match, the computer 30 is also not sure enough that no match occurred to determine that a new element exists. Nevertheless, the possibility of a new element is sufficiently high to warrant reporting the possibility to a system manager. Potential matches and potential no-matches lead to unresolved updates and new elements, respectively. A match by the component attributes of Table 4 is a potential match. The computer 30 reports potential matches and potential no-matches in the report 40 without updating an old element or creating a new element, i.e. these are unresolvable situations.

Figure 5A:
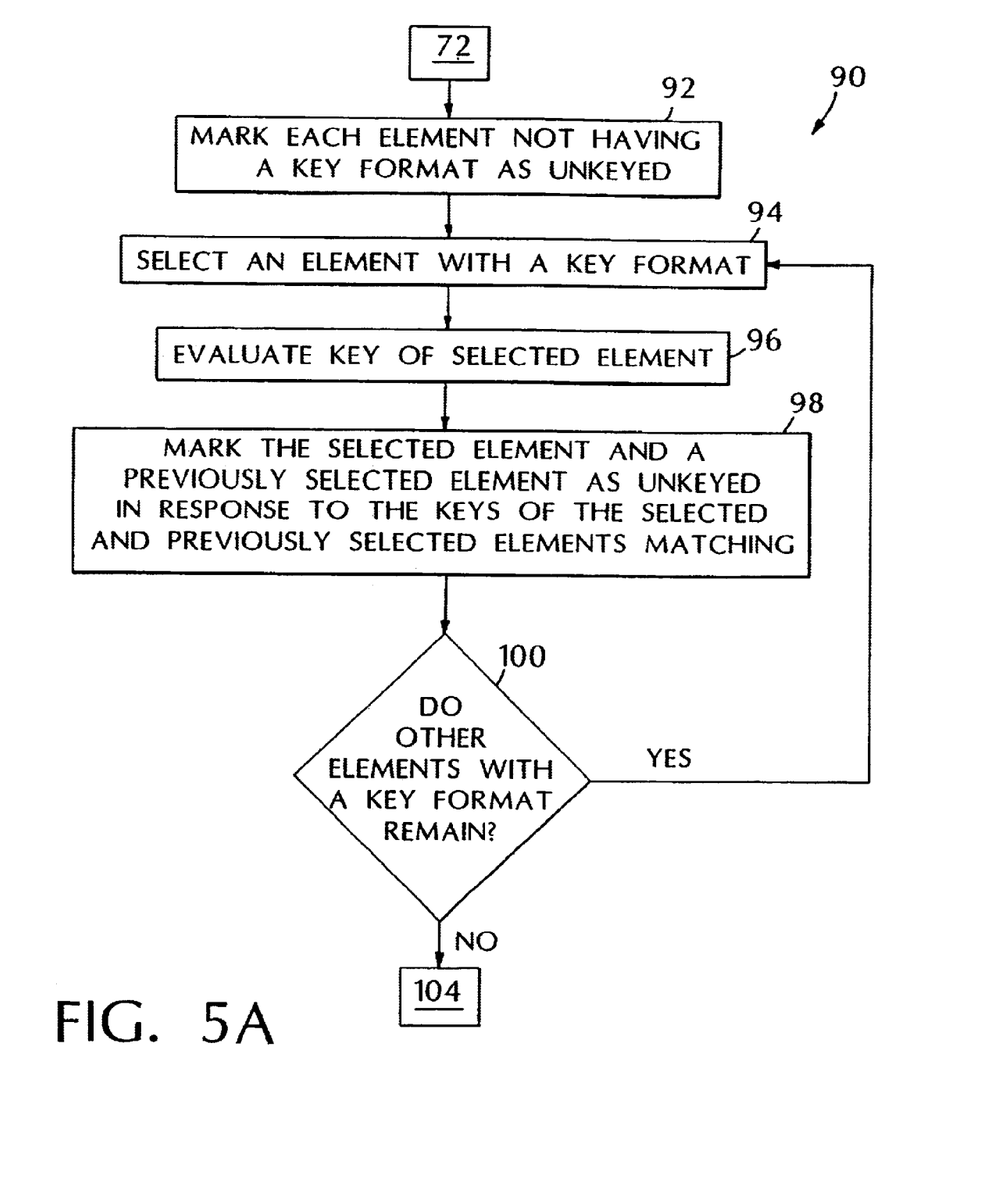
FIGS. 5A–5B is a flow chart illustrating one method of determining whether elements are keyed in the method of FIGS. 4A–4B.
Figure 5B:
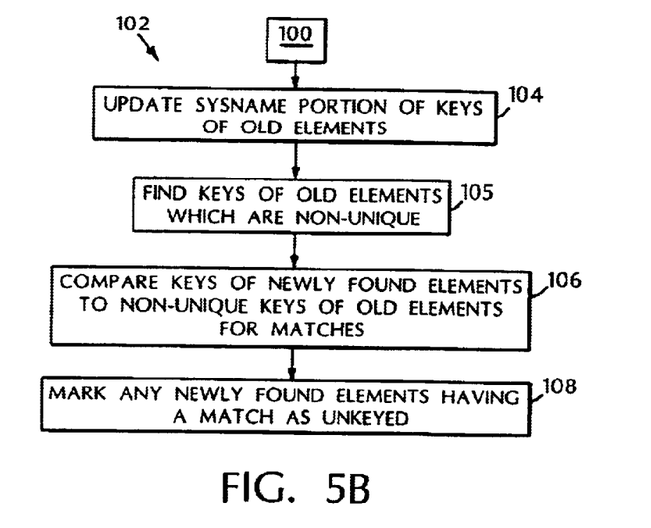

FIGS. 5A–5B is a flow chart illustrating a method 90, 102 for determining whether newly found elements for components have unique keys at block 74 of FIG. 4A. The computer 30 marks each newly found element, which does not have a key format in Table 5, as an element for an unkeyed component (block 92). The computer 30 selects an element for a component, which has a key format described in Table 5 (block 94). The computer 30 evaluates the value of the key format of the component associated with the selected element (block 96). The value of the key format for the component defines a "potential key" for the selected element. The computer 30 marks the selected element and any previously selected element as elements for unkeyed components if the keys match (block 98). Thus, an element is marked unkeyed in response to the value of the key not being unique among the "newly found" elements. The computer 30 determines whether other elements with a key format remain (block 100). If other elements remain, the computer 30 selects the next element with a key format.

FIG. 5B illustrates a method for marking newly found elements for components as unkeyed in response to a key not being unique among the "old" elements. The computer 30 updates the configuration data for the system name (sysName) portions of keys of old elements for which the system name has changed (block 104). The key formats of Table 5 have system name portions, and system name changes could destroy some key matches. By updating system name changes early, one recaptures key matches in later steps, which would otherwise be lost. Some embodiments detect system name changes from matches between the network address and hardware ID of newly found and old elements having different sysName values. Next, the computer 30 determines which keys of old elements are non-unique, i.e. due to two old elements have the same key value (105). Then, the computer 30 compares the key of each newly found element to the non-unique keys of old elements, wherein system name portions are updated (block 106). The computer 30 marks newly found element as unkeyed in response to the newly found elements having a key match with a non-unique key of the old elements (block 108). Thus, a newly found element is marked as keyed only if the key of the element is unique among both the newly found elements and the old elements.

Figure 5C:
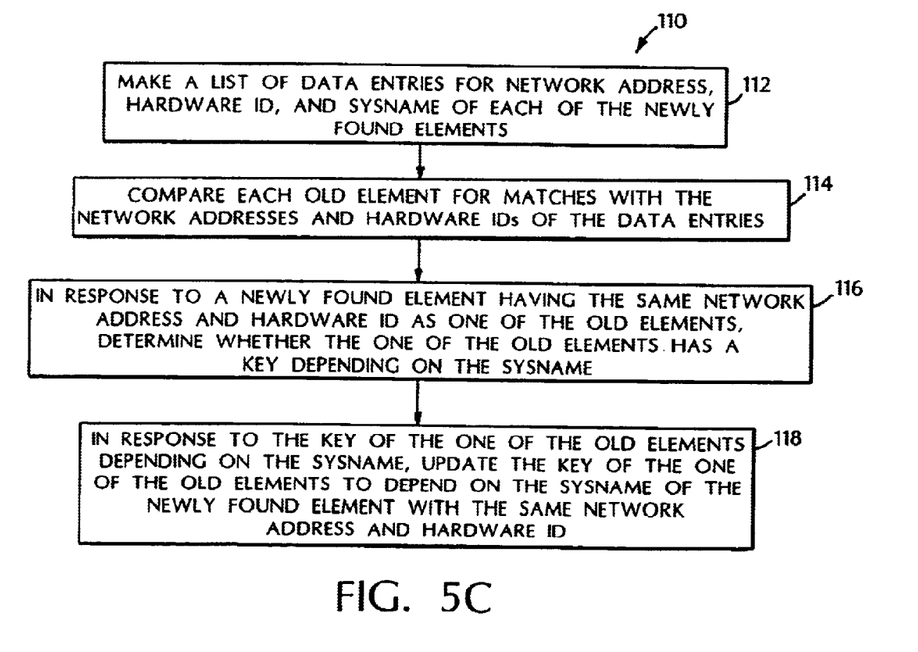
FIG. 5C is a flow chart illustrating a method, which is used by some embodiments, shown in FIGS. 5A–5B, to update keys of old elements in response to system name changes.

FIG. 5C is a flow chart illustrating a method 110 for updating old elements in response to system name changes at block 104 of FIG. 5B. The computer 30 makes a list having an entry for each newly found element (block 112). Each entry contains the associated network address, hardware ID, and system name of the associated newly found element. Then, the computer 30 compares the configuration data of each old element to the list for matches with the network addresses and hardware ID's (block 114). Matching both the network address and hardware ID of an entry indicates that the old element is associated with the same network device as the newly found element for the entry, i.e. a device attribute match. Thus, the system name of the newly found element is the updated system name of the matching old element. In response to an old element matching the network address and hardware ID of an entry, the computer 30 also determines whether the sysName is part of the key format (block 116). Block 116 takes into account that embodiments may use some keys, which do not depend on the system name. In response to determining that the sys-Name is part of the key format, the computer updates the sysName portion of the key of the old element with the sysName of the newly found element for the matching entry (block 118). The computer 30 updates the system name portion of the keys of old elements so that keys are updated for later comparisons between old and newly found elements.

The method 110 identifies elements for devices in response to the elements have matching network addresses and the hardware ID's. This identification uses the probable matching criteria for devices, as discussed above. When two such elements can be so identified to one device, a system name change to the key is updated (see FIG. 6 below).

Figure 6:
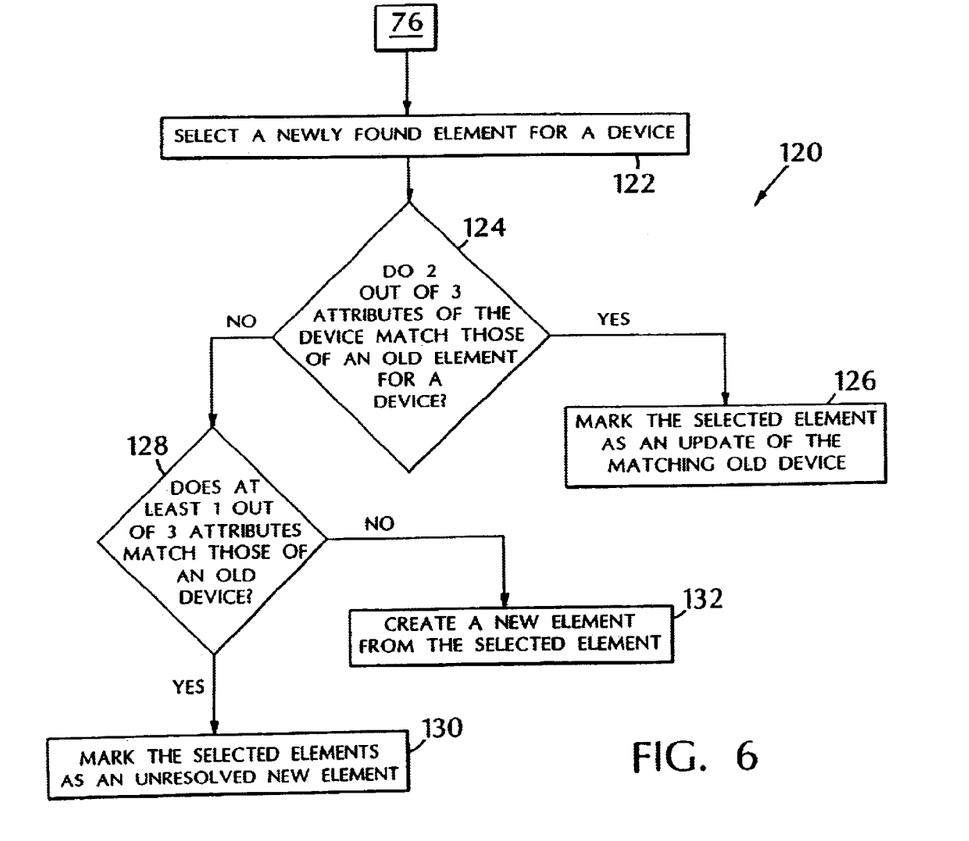
FIG. 6 is a flow chart illustrating a method of determining whether a newly found element for a device is an update of an old element or a new element in the method shown in FIGS. 4A–4B.

FIG. 6 is a flow chart illustrating a method 120 of determining, at block 78 of FIG. 4A, whether a newly found element for a device 12, 13 is an update, a new element, or unresolvable. The computer 30 selects a newly found element for a device (block 122). The computer 30 determines whether two of the three attributes of Table 3 for the selected element match those of an old element for a device 12, 13 (block 124). The computer 30 marks the selected element as an update if the configuration data of the selected element and the matching old element for a device 12, 13 differ (block 126). The computer 30 updates any differences of the configuration data of the matching old element using the configuration data of the selected element. Otherwise, the computer determines whether at least one of the three attributes of Table 3 for the selected element match an attribute of an old element for a device 12, 13 (block 128). The computer 30 marks the selected element as an unresolved new element if a match of one out of three attributes exists (block 130). If the computer finds no matches, the computer 30 creates a new element for a device 12, 13 for the selected element (block 132). The computer 30 performs the steps of the above-described blocks on each newly found element for a network device 12, 13.

Figure 7:
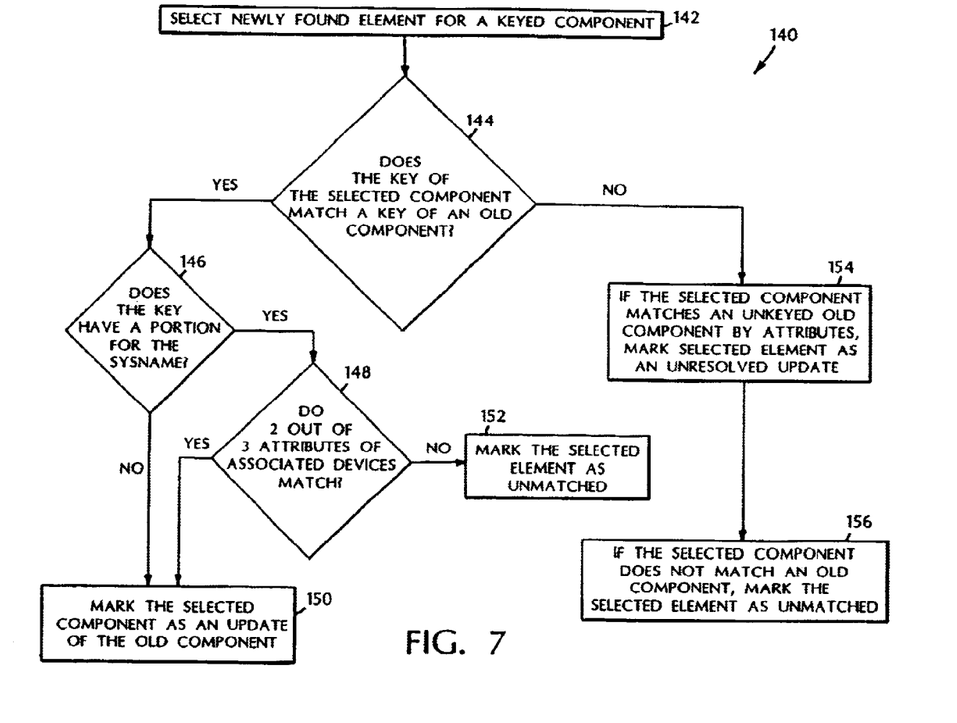
FIG. 7 is a flow chart illustrating a method of determining whether a newly found element for a keyed component is a resolved or unresolved update of an old element in the method of FIGS. 4A–4B.

FIG. 7 is a flow chart illustrating a method 140 of determining whether a newly found element for a keyed component 18, 19 is an update of a keyed old element at block 79 of FIG. 4A. First, the computer 30 selects a newly found element for a keyed component 18, 19 (block 142). Then, the computer 30 determines whether the key of the selected element matches a key of any old element for a keyed component 12, 13 (block 144). The computer determines whether a matching key has a system name portion (block 146). The computer 30 determines whether two out of three attributes of the associated network device 12, 13 for the selected and matching old elements also match if the key depends on the system name (block 148). The computer 30 marks the selected element as an update if the configuration data of the selected and matching old elements differ and either a match is found at block 148 or the key is found to not depend on the system name at block 150. Block 146 accounts for the fact that user created keys may or may not have a system name portion. The computer 30 marks the selected element as unmatched in response to the absence of a match for the associated network device 12, 13 if the key depends on the system name (block 152). The computer 30 marks the selected component as an unresolved update in response to the selected element for a component and an old element for an unkeyed component matching by attributes (block 154). A match by attributes occurs if the associated network devices match, e.g., a match of two out of three attributes of the network devices, and the other component configuration data of the selected and the unkeyed old element also match. A match by attributes requires that all indexes and MTF values of the two components match 18, 19 and that the associated network devices 12, 13 match. The computer 30 marks the selected component as unmatched if the selected component 18, 19 does not otherwise match one of the old components 18, 19 of the network 16 (block 156). The method 140 processes the other newly found elements for keyed components 18, 19 in the same manner.

Figure 8:
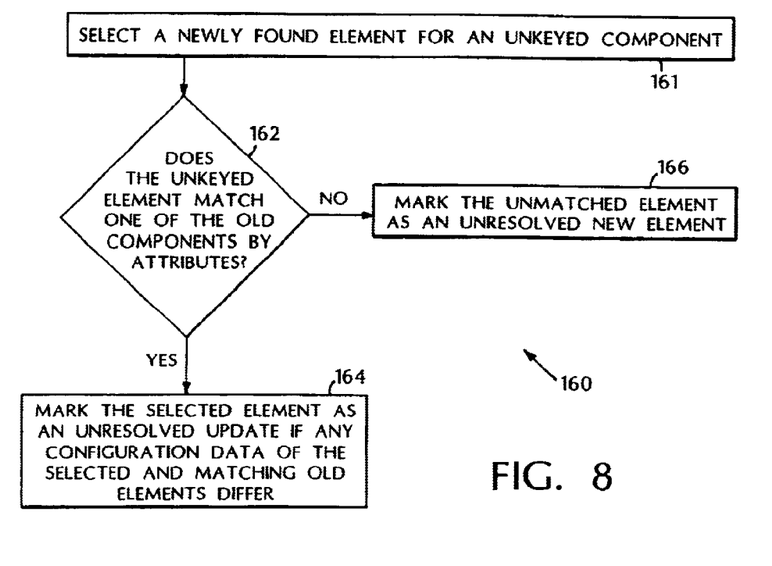
FIG. 8 is a flow chart for a method of determining whether a newly found element for an unkeyed component is an unresolved new element or update of an old element in the method of FIGS. 4A–4B.

FIG. 8 is a flow chart for a method 160 of determining whether a newly found element for an unkeyed component 18, 19 is an unresolved new element or update or an old element at block 82 of FIG. 4B. At block 161, the computer 30 selects a newly found element for an unkeyed component 18, 19. The computer 30 determines whether the selected element matches, by attributes, one of the old elements for a component 18, 19 (block 162). A match by attributes includes a two out of three match for associated network device devices 12, 13 and a match between remaining component configuration data for indexes and MTF values—as described above. The computer 30 marks the newly found element as an unresolved update if there was a match by attributes at block 162 and any configuration data differs, i.e. one of network address, hardware ID, system name, set of indexes, and set of MTF values differs (block 164). Otherwise, the computer 30 marks the unmatched element as an unresolved new element (block 166). The method 160 processes other newly found elements for unkeyed components 18, 19 in the same manner.

Figure 9:
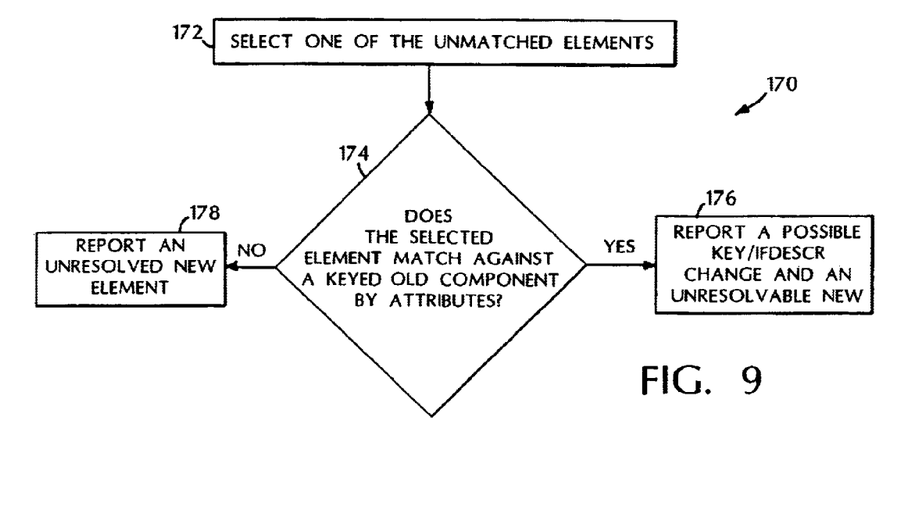
FIG. 9 is a flow chart illustrating a method of determining whether an unmatched element is an unresolved new element or a possible ifDescr change in the method of FIG. 7.

FIG. 9 is a flow chart illustrating a method 170 of determining whether an unmatched element for a keyed component 18, 19 is an unresolved new element or a possible ifDescr update at block 84 of FIG. 4B. The computer 30 selects one of the unmatched elements generated in blocks 152, 156 of FIG. 7 (block 172). The computer 30 determines whether the selected element matches, by attributes, one of the old elements for a keyed component 18, 19 (block 174). A match by attributes includes a match for associated network devices 12, 13 and a match between the remaining configuration data—as described above. The computer 30 marks the element as an unresolvable new element if there is a match by attributes also indicating a possible ifDescr and key change in the report 40 (block 176). An ifDescr change can induce a key change, because many key formats of Table 5 depend on the ifDescr value. Otherwise, the computer reports an unresolved new element (block 178). The method treats the remaining unmatched elements from blocks 152, 156 of FIG. 7 in the same manner.

In FIGS. 4A–9, some embodiments account for some user changes and/or compatibility for software updates by saving both originally found and current values of selected configuration data. For example, current values of the system name and ifDescr OID's could be stored in locations sysName and ifDescr, and values first found by the polling step, at block 52 of FIG. 3 could be stored in respective locations OldsysName and OldifDescr. Then, some steps of FIGS. 4A–9, could check both the current and original values of the selected types of configuration data when looking for matches with newly found values, see e.g., blocks 78–84, 114, 124, 128, 144, 148, 154, 162. By checking for a match with either the current and the originally found values, the method can detect matches even in light of certain unanticipated user changes and/or subsequent software updates, which redefine the selected data. Some embodiments may extend this feature to check for matches with several previously found values by storing several previously found values of selected configuration data or by looking up a mapping of new to old values from an external source. The invention covers similar modifications, which would be known to a person of skill in the art in light of the above disclosure.

In FIGS. 1–9, the large network 16 may have a variety of forms. The large network 16 may be a WAN, a LAN, a FDDI, an ATM line, a bus, or the internet. The network device's 12, 13 and a management system 26 may support one or more protocols handled by the large network 16.

What is claimed is:

1. A method of merging a list of newly found network elements and a list of old network elements, comprising:

receiving the list of newly found elements and associated configuration data;

deriving a potential key value for a portion of the newly found elements from a portion of the configuration data associated therewith and a key format;

determining whether each newly found element with a potential key value is keyed or unkeyed, a particular newly found element being unkeyed if two of the newly found elements have the same potential key value; and updating one of the old elements with the configuration data of a specific newly found keyed element in response to the specific newly found and the one of the old elements having the same key.

2. The method of claim 1, wherein the configuration data is adapted to enable a network user to use an associated network element.

3. The method of claim 1, wherein the portions of the configuration data used to derive potential key values are unaffected by a plurality of events, wherein the events change one of a device and a component of the network without creating or destroying elements.

4. The method of claim 1, further comprising: determining that one of the newly found elements is unkeyed in response to the potential key value associated therewith being a potential key value of at least two of the old elements.

5. The method of claim 1, further comprising:

removing siblings of elements from the list of newly found elements.

6. The method of claim 1, wherein each network element represents one of a network device and a component of a network device.

7. The method of claim 6, wherein the updated one of the old elements corresponds to a component of a network device.

8. The method of claim 6, wherein configuration data comprises network addresses, object identifier data from management information bases, management information base translation file data, and indexes for the object identifiers.

9. The method of claim 1, further comprising:

determining that a particular portion of a key of a selected old element has changed in response to finding a match between selected attributes of the selected old element and a newly found element, the particular portion of the key of the selected old and the matching newly found elements being different; and updating the particular portion of the key of the selected old element with of the key of the matching newly found element.

10. The method of claim 9, wherein the particular portion of the key is derived from a system name.

11. A method of updating a list of old network elements with a list of newly found network elements, comprising:

receiving the list of newly found elements and associated configuration data; and updating the configuration data of one of the old elements with the configuration data of one of the newly found elements in response to a proper subset of the attributes of the one of the old elements matching attributes of the one of the newly found elements, the proper subset comprising at least two attributes.

12. The method of claim 11, wherein the attributes of an element for a device consist of a proper subset of the device's configuration data, at least two of the device's attributes are unchanged by special events, the special events change the device without creating or destroying an element.

13. The method of claim 11, wherein the one of the old elements is a network device.

14. The method as set forth in claim 13, wherein the attributes of a network device comprise an associated network address, an associated hardware identifier, and an associated system name assigned to a local database of the network device.

15. The method of claim 12, wherein the proper subset comprises two out of three of the attributes.

16. The method of claim 11, wherein the attributes for a component of a network device comprise attributes of the network device, indexes for object identifiers of the component in a database of the network device, and translation file values for the object identifiers of the component.

17. The method of claim 11, further comprising:

reporting a second of the newly found elements for a device as unresolved in response to an attribute of the second of the newly found elements matches an attribute of an old element for a device and less than a majority of the attributes of the second of the newly found elements matches attributes of the old element for a device.

18. A method of reporting updates and new network elements, comprising:

receiving a list of newly found elements for components and associated configuration data;

comparing a plurality of attributes of each of the newly found elements with attributes of old network elements for attribute matches; and reporting one of the matches by listing a pair of matching elements as unresolved in response to one element of the pair not having a unique key.

19. The method of claim 18, further comprising:

reporting another of the attribute matches as unresolved in response two elements matching and having different keys.

20. The method of claim 18, wherein the step of reporting includes indicating that the one of the matches is an unresolved update in response to one element of the pair being an unkeyed new element.

21. The method of claim 18, further comprising:

reporting a particular newly found element as an unresolved new element in response to the step of comparing finding no attribute matches for the particular newly found element.

22. The method of claim 18, wherein the attributes for a component of a network device comprise attributes of the network device, indexes for object identifiers of the component in a local database of the device, and translation file values for the component in the local database.

23. A method of merging newly found and old network elements, comprising:

receiving newly found elements and associated configuration data;

deriving a potential key value for a first portion of the newly found elements from the configuration data and a key format;

determining whether the elements of the first portion are keyed or unkeyed, an element being unkeyed if two newly found elements have the same potential key value;

updating one old element for a component with the configuration data of one newly found keyed element if the one newly found and the one old element have the same key;

comparing attributes a second portion of newly found elements for components with attributes of old elements for attribute matches; and reporting one of the matches by listing a pair of matching elements as unresolved in response to one element of the pair not having a unique key.

24. The method of claim 23, further comprising:

updating one of the old elements for a device with the configuration data of one of the newly found elements in response to a proper subset of the attributes of the one of the old elements matching attributes of the one of the newly found elements, the proper subset comprising at least two attributes.

25. The method of claim 23, further comprising:

reporting a second of the newly found elements for a component as unresolved in response to the step of comparing resulting in no matches.

26. A program storage device readable by a computer tangibly embodying a program of instructions executable by the computer to perform a method of merging found and old network elements, the method comprising:

receiving the list of newly found elements and associated configuration data;

deriving a potential key value for a portion of the newly found elements from a portion of the configuration data associated therewith and a key format;

determining whether each newly found element with a potential key value is keyed or unkeyed, a particular newly found element being unkeyed if two of the newly found elements have the same potential key value; and updating one of the old elements with the configuration data of a specific newly found keyed element in response to the specific newly found and the one of the old elements having the same key.

27. The program storage device of claim 26, wherein the configuration data is adapted to enable a network user to use an associated network element.

28. The program storage device of claim 26, wherein the portions of the configuration data used to derive potential key values are unaffected by a plurality of events, wherein the events change one of a device and a component of the network without creating or destroying an element.

29. The program storage device of claim 26, wherein the method further comprises:

determining that one of the newly found elements is unkeyed in response to the potential key value associated therewith being a potential key value of at least two of the old elements.

30. The program storage device of claim 26, wherein the method further comprises:

removing siblings of elements from the list of newly found elements.

31. The program storage device of claim 26, wherein each network element of the lists represents one of a network device and a component of a network device.

32. The program storage device of claim 31, wherein the updated one of the old elements corresponds to a component of a network device.

33. The program storage device of claim 31, wherein configuration data comprises network addresses, object identifier data from management information bases, management information base translation file data, and indexes for the object identifiers.

34. The program storage device of claim 26, wherein the method further comprises:

determining that a particular portion of a key of a selected old element has changed in response to finding a match between selected attributes of the selected old element and a newly found element, the particular portion of the key of the selected old and the matching newly found elements being different; and updating the particular portion of the key of the selected old element with of the key of the matching newly found element.

35. The program storage device of claim 34, wherein the particular portion of the key is derived from a system name.

36. A program storage device readable by a computer, tangibly embodying a program of instructions executable by the computer to perform a method of updating a list of old network elements with a list of newly found network elements, the method comprising:

receiving the list of newly found elements and associated configuration data; and updating the configuration data of one of the old elements with the configuration data of one of the newly found elements in response to a proper subset of the attributes of the one of the old elements matching attributes of the one of the newly found elements, the proper subset comprising at least two attributes.

37. The program storage device of claim 36, wherein the one of the old elements is a network device.

38. The program storage device as set forth in claim 36, wherein the attributes of a network device comprise an associated network address, an associated hardware identifier, and an associated system name assigned to a local data base of the network device.

39. The program storage device of claim 36, wherein the attributes for a component of a network device comprise attributes of the network device, indexes for object identifiers of the component in a database of the network device, and translation file values for the object identifiers of the component.

40. The program storage device of claim 36, the method further comprising:

reporting a second of the newly found elements as unresolved if an attribute of the second of the newly found elements matches an attribute of an old element for a device and less than a majority of the attributes of the second of the newly found elements matches attributes of the old element for a device.

41. A program storage device readable by a computer, tangibly embodying a program of instructions executable by the computer to perform a method of reporting updates and new network elements, the method comprising:

receiving a list of newly found elements for components and associated configuration data;

comparing a plurality of attributes of each of the newly found elements with attributes of old network elements for attribute matches; and reporting one of the matches by listing a pair of matching elements as unresolved in response to one element of the pair not having a unique key.

42. The program storage device of claim 41, the method further comprising:

reporting another of the attribute matches as unresolved in response two elements matching and having different keys.

43. The program storage device of claim 41, wherein the method step of reporting includes indicating that the one of the matches is an unresolved update in response to one element of the pair being an unkeyed new element.

44. The program storage device of claim 41, the method further comprising:

reporting a particular newly found element as an unresolved new element in response to the step of comparing finding no attribute matches for the particular newly found element.

45. The program storage device of claim 41, wherein the attributes for a component of a network device comprise attributes of the network device, indexes for object identifiers of the component in a local database of the device, and translation file values for the component in the local database.

46. A program storage device readable by a computer, tangibly embodying a program of instructions executable by the computer to perform a method of merging newly found and old network elements, the method comprising:

receiving newly found elements and associated configuration data;

deriving a potential key value for a first portion of the newly found elements from the configuration data and a key format;

determining whether the elements of the first portion are keyed or unkeyed, an element being unkeyed if two newly found elements have the same potential key value;

updating one old element for a component with the configuration data of one newly found keyed element if the one newly found and the one old element have the same key;

comparing attributes of newly found elements for components with attributes of old elements for attribute matches; and reporting one of the matches by listing a pair of matching elements as unresolved in response to one element of the pair not having a unique key.

47. The program storage device of claim 46, the method further comprising:

updating one of the old elements for a device with the configuration data of one of the newly found elements in response to a proper subset of the attributes of the one of the old elements matching attributes of the one of the newly found elements, the proper subset comprising at least two attributes.

48. The program storage device of claim 46, the method further comprising:

reporting a second of the newly found elements for a component as unresolved in response to the step of comparing resulting in no matches.

* * * * *